US011494054B2

(12) United States Patent
Song et al.

(10) Patent No.: US 11,494,054 B2
(45) Date of Patent: Nov. 8, 2022

(54) ITEM RECOMMENDATION BASED ON COMPUTED SIMILARITY BETWEEN AUTOMATICALLY GENERATED ITEM AND REQUEST PROFILES

(71) Applicant: International Business Machines Corporation, Armonk, NY (US)

(72) Inventors: Xiang Yu Song, Shanghai (CN); Xiao Yuan Ma, Beijing (CN); Chao Yuan Huang, Taipei (TW); Yu Jie Gu, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 70 days.

(21) Appl. No.: 17/075,665

(22) Filed: Oct. 20, 2020

(65) Prior Publication Data
US 2022/0121327 A1 Apr. 21, 2022

(51) Int. Cl.
*G06F 16/9535* (2019.01)
*G06F 9/451* (2018.01)
(Continued)

(52) U.S. Cl.
CPC ............ *G06F 3/0482* (2013.01); *G06F 9/451* (2018.02); *G06F 16/2457* (2019.01); *G06F 16/9535* (2019.01)

(58) Field of Classification Search
CPC .... G06F 3/0482; G06F 9/451; G06F 16/2457; G06F 16/9535
See application file for complete search history.

(56) References Cited

U.S. PATENT DOCUMENTS 10,114,897 B1 * 10/2018 Ledet .................. G06F 16/9535
10,489,016 B1 * 11/2019 Yue ...................... H04N 21/233
(Continued)

FOREIGN PATENT DOCUMENTS

| JP | 4891802 B2 | 3/2012 |
| KR | 20120101233 A | 9/2012 |

OTHER PUBLICATIONS

"A Method and System for Associating Emotions with Media for Improved Correlations and Recommendations", An IP.com Prior Art Database Technical Disclosure, Disclosed Anonymously, IP.com No. IPCOM000238505D, IP.com Electronic Publication Date: Aug. 31, 2014, 4 pages.
(Continued)

*Primary Examiner* — Roberto Borja
(74) *Attorney, Agent, or Firm* — Michael A. Petrocelli

(57) ABSTRACT

Embodiments of the present disclosure relate to attribute-based selectable item recommendation. A computer-implemented method is disclosed. A computer generates respective attribute profiles of selectable items based on one or more attribute elements included in the selectable items. The profiles include at least one attribute elements respectively correspond to the selectable items. The computer generates an attribute requirement description of an item requesting agent based on a historical search dataset of the item requesting agent. The attribute requirement description includes at least part of the one or more attribute elements. The computer determines recommended selectable items included in the selectable items for the item requesting agent based on the attribute profiles of the selectable items and the attribute requirement description of the item requesting agent. The attribute profiles of the recommended selectable items are suitable with the attribute requirement description based on the one or more attribute elements.

17 Claims, 8 Drawing Sheets

(51) Int. Cl.
*G06F 16/2457* (2019.01)
*G06F 3/0482* (2013.01)

(56) References Cited

U.S. PATENT DOCUMENTS

| | | | |
|---|---|---|---|
| 2010/0138413 A1* | 6/2010 | Wu | G06F 16/9535 |
| | | | 707/E17.108 |
| 2012/0284283 A1* | 11/2012 | Matsushita | G06F 16/9535 |
| | | | 707/748 |
| 2014/0130076 A1 | 5/2014 | Moore | |
| 2017/0286546 A1* | 10/2017 | Cardonha | G06F 16/9535 |
| 2018/0049688 A1 | 2/2018 | Knight | |
| 2019/0014378 A1 | 1/2019 | Shah | |
| 2021/0256548 A1* | 8/2021 | Heinonen | G06Q 30/0206 |

OTHER PUBLICATIONS

"A New Method to improve recommendation strategies by emotion analysis", An IP.com Prior Art Database Technical Disclosure, Disclosed Anonymously, IP.com No. IPCOM000262362D, IP.com Electronic Publication Date: May 23, 2020, 3 pages.

Mell et al., "The NIST Definition of Cloud Computing", National Institute of Standards and Technology, Special Publication 800-145, Sep. 2011, 7 pages.

\* cited by examiner

(12) United States Patent
US 11,494,054 B2

ITEM RECOMMENDATION BASED ON COMPUTED SIMILARITY BETWEEN AUTOMATICALLY GENERATED ITEM AND REQUEST PROFILES

BACKGROUND

The present invention relates to computerized item recommendation, and more specifically, to making item recommendations from among a wide variety of options.

Selecting and identifying required data from among large amounts of information can be difficult when data choices are varied and high in number, as is possible with modern computing datasets. Item requesting agents, (e.g., for instance, a number of client machines or other similar requesting agents), that want to get identify intent items that can fulfill search demands from a server, need to search intent selectable items by means of various search tools and approaches, for instance, referring to recommendations made by Artificial Intelligence (AI) or similar expert systems, etc. It can be time consuming to search for appropriate items from a mass of data or information using expert systems, and search time for intent selectable items is often limited. Additionally, the search results produced with conventional search tools and approaches can be low quality when used on large and varied datasets.

SUMMARY

According to one embodiment of the present invention, the present disclosure provides a computer-implemented method. The method includes generating respective attribute profiles of selectable items based on one or more attribute elements included in the selectable items. Each of attribute profiles includes at least one of the one or more attribute elements and is respectively corresponding to each of the selectable items. The method further includes generating an attribute requirement description of an item requesting agent based on a historical search dataset of the item requesting agent. The attribute requirement description includes at least part of the one or more attribute elements. The method further includes determining recommended selectable items included in the selectable items for the item requesting agent based on the attribute profiles of the selectable items and the attribute requirement description. The attribute profiles of the recommended selectable items are suitable with the attribute requirement description based on the at least part of the one or more attribute elements.

According to another embodiment of the present invention, the present disclosure provides a system. The system includes at least one processing unit and a memory coupled to the at least one processing unit and storing instructions thereon. The instructions, when executed by the at least one processing unit, perform acts which include generating respective attribute profiles of selectable items based on one or more attribute elements included in the selectable items. Each of attribute profiles includes at least one of the one or more attribute elements and is respectively corresponding to each of the selectable items. The acts further include generating an attribute requirement description of an item requesting agent based on a historical search dataset of the item requesting agent. The attribute requirement description includes at least part of the one or more attribute elements. The acts further include determining recommended selectable items included in the selectable items for the item requesting agent based on the attribute profiles of the selectable items and the attribute requirement description. The attribute profiles of the recommended selectable items are suitable with the attribute requirement description based on the at least part of the one or more attribute elements.

According to one or more embodiments of the present disclosure, the present disclosure provides a computer program product. The computer program product includes a computer readable storage medium having program instructions embodied therewith. The program instructions are executable by an electronic device to cause the electronic device to perform acts which include generating respective attribute profiles of selectable items based on one or more attribute elements included in the selectable items. Each of attribute profiles includes at least one of the one or more attribute elements and is respectively corresponding to each of the selectable items. The acts further include generating an attribute requirement description of an item requesting agent based on a historical search dataset of the item requesting agent. The attribute requirement description includes at least part of the one or more attribute elements. The acts further include determining recommended selectable items included in the selectable items for the item requesting agent based on the attribute profiles of the selectable items and the attribute requirement description. The attribute profiles of the recommended selectable items are suitable with the attribute requirement description based on the at least part of the one or more attribute elements.

Aspects of the present invention recognize and address a need to solve the aforementioned problems on selectable item search and provide an efficient and accurate solution to attribute-based selectable item recommendation.

Aspects of the present invention recognize and address a need to provide item recommendations based on specific features (e.g., price, quality, quantity, review, or emotion etc.), especially focusing on generating static attribute or feature curves, generating dynamic attribute of feature curves, time-related or time-irrelated feature curves using a computer-implemented matching method (with m-dimensional Euclidean Distance and Pearson Correlation Coefficient) and adjustment of recommendation weight based on request requirements.

BRIEF DESCRIPTION OF THE SEVERAL VIEWS OF THE DRAWINGS

Through the more detailed description of some embodiments of the present disclosure in the accompanying drawings, the above and other objects, attributes and advantages of the present disclosure will become more apparent, wherein the same reference generally refers to the same components in the embodiments of the present disclosure.

DETAILED DESCRIPTION

Figure 1:
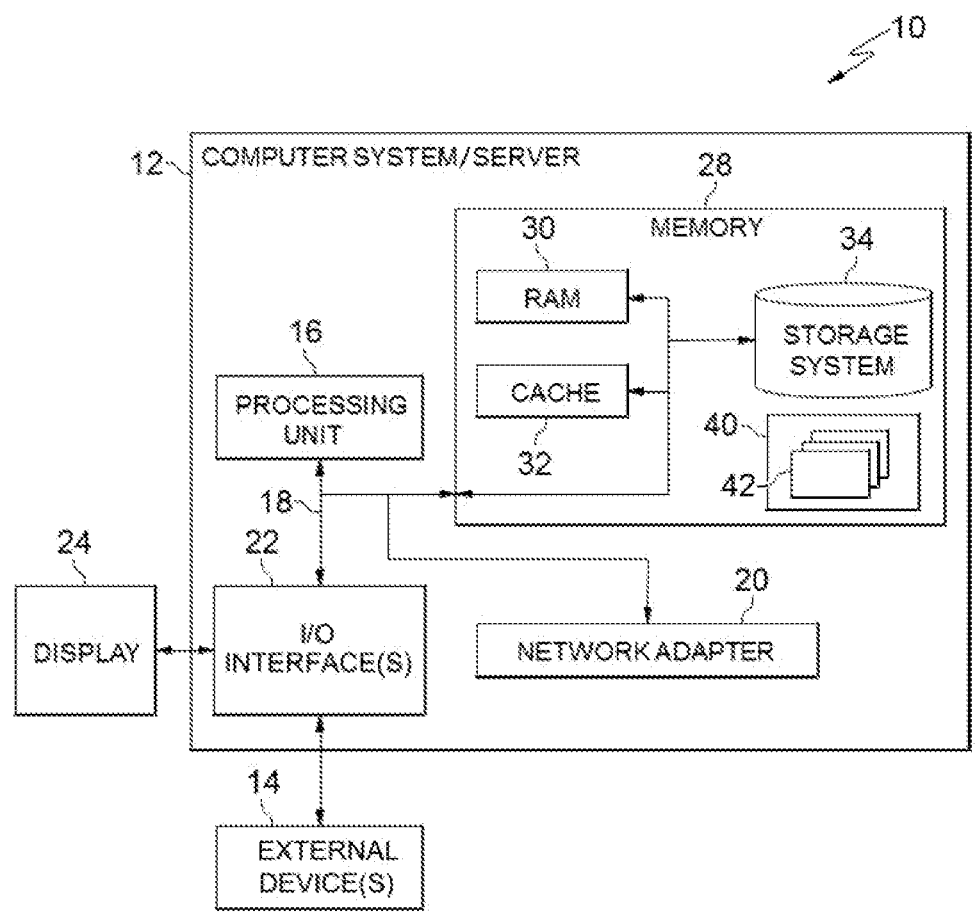
FIG. 1 depicts a cloud computing node according to an embodiment of the present invention.

Some embodiments will be described in more detail with reference to the accompanying drawings, in which the embodiments of the present disclosure have been illustrated. However, the present disclosure can be implemented in various manners, and thus should not be construed to be limited to the embodiments disclosed herein.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are applicable over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities applicable for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made applicable to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12 or a portable electronic device such as a communication device, which is operational with numerous other general purpose or special purpose computing system environments or configurations. Examples of known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being performed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any applicable media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination such that, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
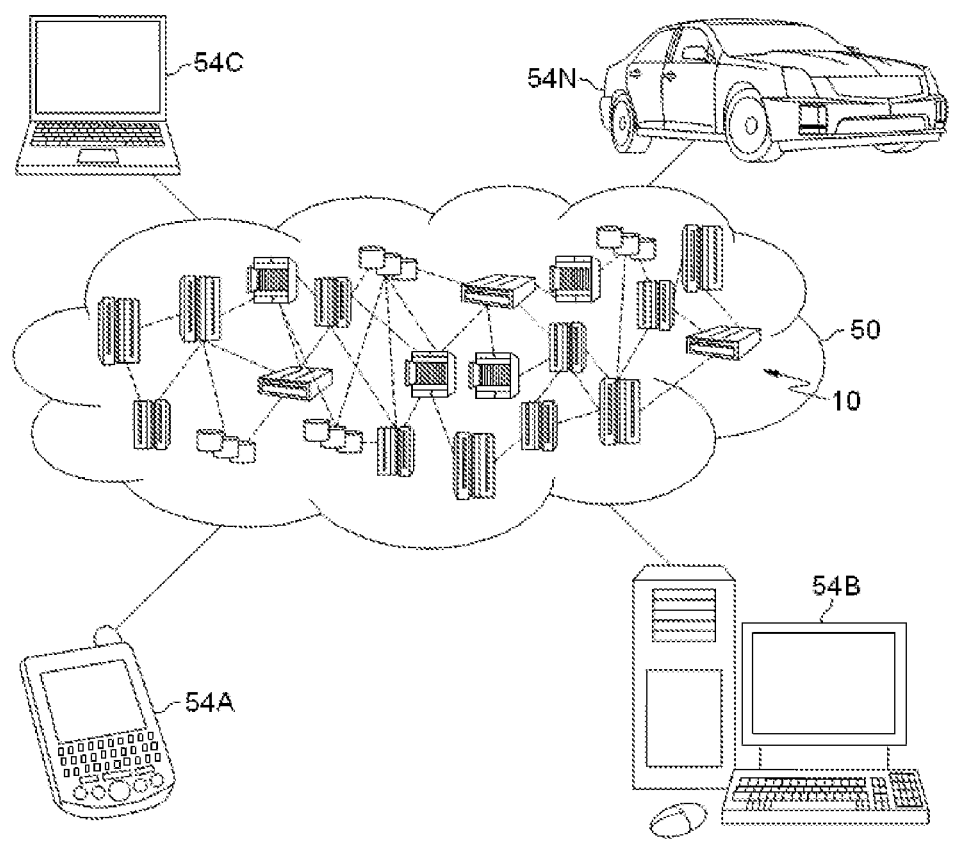
FIG. 2 depicts a cloud computing environment according to an embodiment of the present invention.

Referring now to FIG. 2, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination such that. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
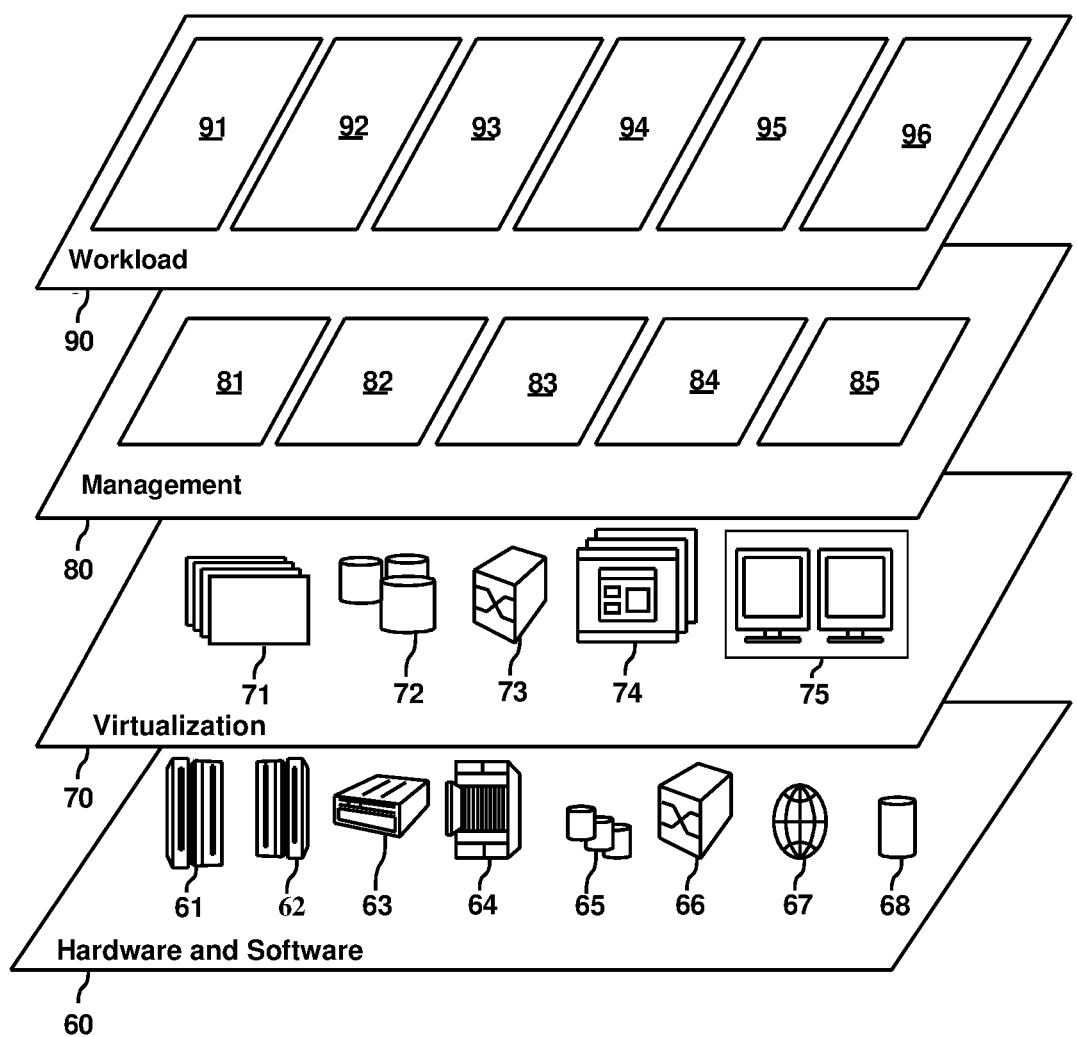
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and attribute-based selectable item recommendation 96 will be described in the following embodiments of the present disclosure.

Data or information scales of items are extremely huge and varied in the current computing field. Item requesting agents (e.g., for instance, client machines or other similar requesting agents), which want to get selectable items that can fulfill item demands from a server, need to search selectable items by means of various data search tools and approaches. It may take plenty of time to search satisfying selectable items from a mass of selectable items, but time employed to search selectable items is often limited. On the other agent, search qualities of conventional data search methods and tools are not easy to be guaranteed. Generally, conventional search tools and approaches can only provide selectable items for item requesting agents based on rough categories of selectable items. The rough categories cannot accurately indicate attributes included in selectable items. As a result, it is difficult to accurately and efficiently search out selectable items which can fulfill search demands of item requesting agents by means of conventional data search tools and approaches. Accordingly, there is a need to solve the aforementioned problems on selectable item search and provide an efficient and accurate solution to attribute-based selectable item recommendation.

Figure 4:
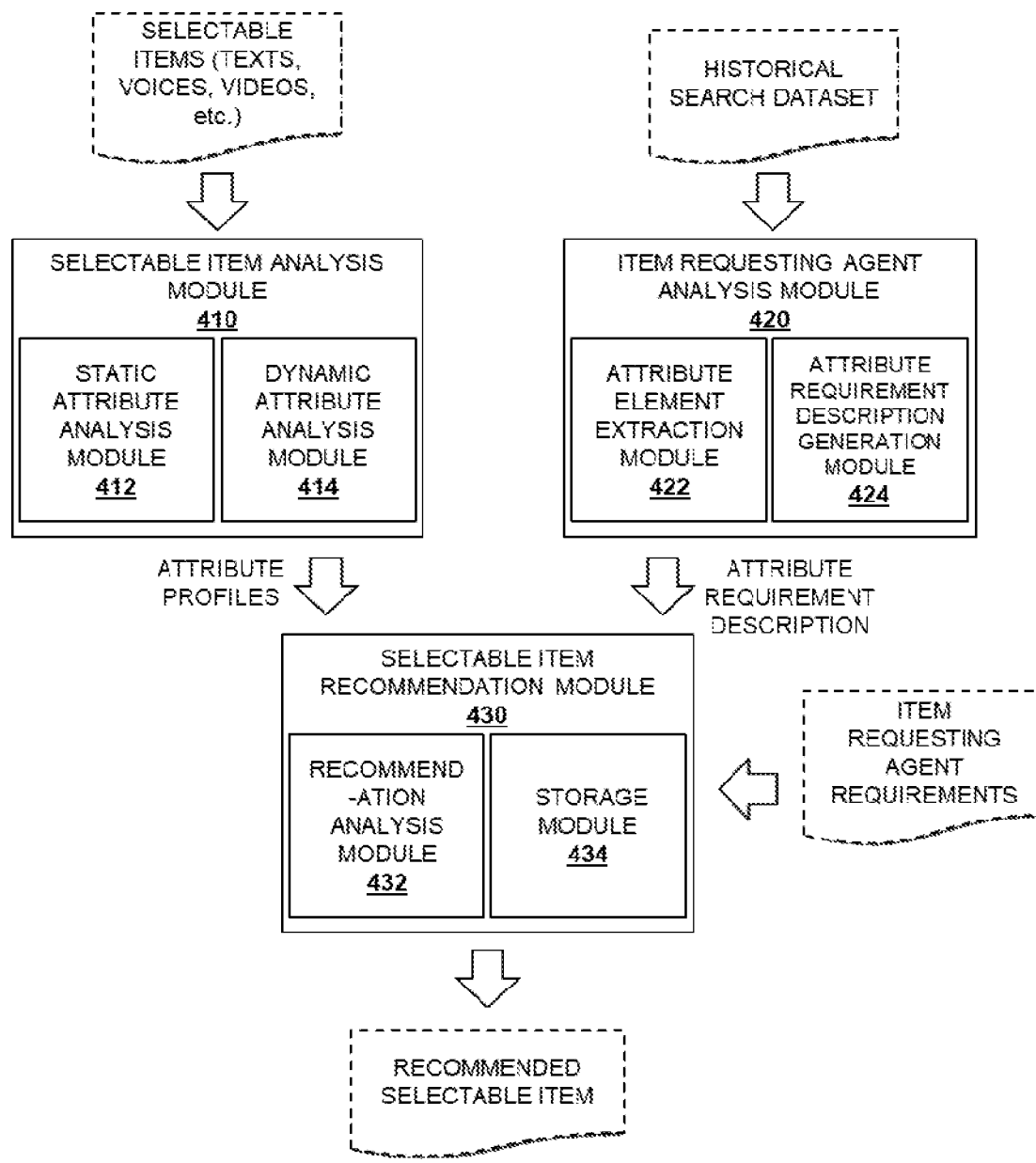
FIG. 4 depicts a block diagram illustrating an exemplary attribute-based selectable item recommendation system according to some embodiments of the present disclosure.

As mentioned in the above, a method, system and computer program product for attribute-based selectable item recommendation can be employed in course of searching selectable items, for instance, client machines which want to obtain selectable items that can fulfill search demands from a server. FIG. 4 depicts block diagrams illustrating an exemplary attribute-based selectable item recommendation system according to some embodiments of the present disclosure. It should be recognized that the arrangement of elements or modules in FIG. 4 and the number of elements or modules depicted therein are provided for the purpose of illustration only. In other embodiments, attribute-based selectable item recommendation system 400 may include more, less and/or different elements or modules and be with different arrangements.

In some embodiments of the present disclosure, the attribute-based selectable item recommendation system 400 is provided to implement a computer-implemented method for attribute-based selectable item recommendation which will be described in the present disclosure. The attribute-based selectable item recommendation system 400 includes a selectable item analysis module 410, an item requesting agent analysis module 420, and a selectable item recommendation module 430. Furthermore, the selectable item analysis module 410 may include a static attribute analysis module 412 and a dynamic attribute analysis module 414. The item requesting agent analysis module 420 may include an attribute element extraction module 422 and an attribute requirement description generation module 424. The selectable item recommendation module 430 may include a recommendation analysis module 432 and a storage module 434.

Notwithstanding, attribute-based selectable item recommendation system 400 depicted in FIG. 4 includes the aforementioned modules, but there is no limitation provided to modules or elements included in attribute-based selectable item recommendation system 400. Attribute-based selectable item recommendation system 400 may include other modules or elements for implementing more functionalities and objectives in accordance with various user's requirements and experiences.

In some embodiments of the present disclosure, attribute-based selectable item recommendation system 400 is implemented in a distributed computing environment, for instance, a cluster computing environment, a grid computing environment, a server/client network computing environment or a cloud computing environment, etc. A distributed computing environment can implement attribute-based selectable item recommendation system 400 by components of the distributed computing environment including hardware, software or their combinations. According to performance and capability based on a distributed computing environment, attribute-based selectable item recommendation system 400 can perform the computer-implemented method for attribute-based selectable item recommendation which will be described in the present disclosure.

In some embodiments of the present disclosure, attribute-based selectable item recommendation system 400 may be deployed on remote computing platforms, for example, a cloud computing platform and/or a cloud storage service system which can provide remote computing resource to implement at least part of functionalities of attribute-based selectable item recommendation system 400 and provide respective computing resources, information resource or supporting services, for instance, massive remote storage space for selectable item datasets. In these embodiments, the remote computing platforms would be resilient and adapted to computing performance, storage capacity, response speed, display effect and the like in accordance with user requirements.

In some embodiments of the present disclosure, include selectable item analysis module 410, item requesting agent analysis module 420, and selectable item recommendation module 430 are in communication with each other by means of electronic or wireless connections, for instance, cables, buses, local area network (LAN), general wide area network (WAN), public network (e.g., the Internet), Wi-Fi network, Bluetooth connection or a combination of them, etc.

In some embodiments of the present disclosure, selectable item analysis module 410 may generate respective attribute profiles of selectable items based on one or more attribute elements included in the selectable items. The attribute profiles correspond to the selectable items. The selectable items to be provided to item requesting agents can have various forms or types, for instance, raw data files, texts, videos, images, voices, messages or their combinations, etc. In some embodiments, for the aforementioned objectives or functionalities, selectable item analysis module 410 may receive the selectable items from a local storage device or a network resource as shown in FIG. 4. The selectable items may be generated or provided by various item resources, for instance, item productors, item providers, or item storage devices, etc. In the present disclosure, it is noted that attribute elements, for instance, data types, data structures, data lengths, or data contents (collectively called attributes), may be included in or represented by selectable items with various applicable forms. In some embodiments of the present disclosure, one selectable item may include or represent one or more attribute elements 506, for instance, both of two attributes may be included in or represented by one video file. In the present disclosure, an attribute profile of a selectable item may provide a quantified approach of attribute elements included in or represented by the selectable item by means of an applicable form. Furthermore, the selectable item can be identified with a corresponding attribute profile of the selectable item. Therefore, the attribute profile of the selectable item can be employed as an index compared with attribute profiles of other selectable items to determine whether the selectable item may be recommended to item requesting agents.

In some embodiments of the present disclosure, selectable item analysis module 410 may further include static attribute analysis module 412. Static attribute analysis module 412 may extract the one or more attribute elements based on a first part of information of the selectable items. The first part of information of the selectable items are irrelated to time. The first part of information of the selectable items may include static information of the selectable items which is not provided with temporal correlations. For instance, the static information may be selectable item titles, selectable item abstracts, item requesting agent reviews, selectable item productors, etc. In some embodiments, for extracting the one or more attribute elements from the selectable items which include or are constructed by natural languages, static attribute analysis module 412 may employ machine learning algorithms, for instance, natural language attribute analysis (NLEA) algorithms, to extract attribute labels from the natural languages corresponding to the selectable items. In some embodiments, static attribute analysis module 412 may further extract attribute words which can present category attributes included in or represented by the attribute labels, for instance, "a normal data file", "a broken data file", "a new data file", or "an old data file", etc. Furthermore, static attribute analysis module 412 may determine the one or more attribute elements corresponding to the attribute words, for instance, the attribute element of attribute 1 corresponding to words "a normal data file", or the attribute element of attribute 2 corresponding to words "an broken data file" extracted from labels or reviews on a data file. Static attribute analysis module 412 may further generate the attribute profiles of the selectable items based on the one or more attribute elements corresponding to the first part of information of the selectable items. Each of the one or more attribute elements is quantized as a time-irrelated proportion based on a ratio between respective attribute information corresponding to each of the one or more attribute elements and all of the attribute information corresponding to the one or more attribute elements.

In some embodiments of the present disclosure, attribute 1 is quantized as a ratio based on the percentage of attribute 1 in the five attribute elements by static attribute analysis module 412. For instance, static attribute analysis module 412 may generate an attribute profile of selectable item 1 as the following table:

TABLE 1

| ATTRIBUTE PROFILE OF SELECTABLE ITEM 1 | | | | |
|---|---|---|---|---|
| ATTRIBUTE 1 | ATTRIBUTE 2 | ATTRIBUTE 3 | ATTRIBUTE 4 | ATTRIBUTE 5 |
| 32% | 57% | 3% | 3% | 5% |

As shown in Table 1, attribute profile of selectable item 1 includes five attribute elements such as attribute 1, attribute 2, attribute 3, attribute 4, and attribute 5. Each of the attribute elements is respectively quantized as a time-irrelated proportion. As shown in Table 1, attribute 1 is quantized as 32% which is a proportion in selectable item 1 based on the percentage of attribute 1 in the five attribute elements, for instance, the percentage of item labels or reviews including attribute 1 in all of item labels or reviews generated by client machines which have visited (or used) selectable item 1. It would be noted that Table 1 would not provide a limitation to respective attribute profiles of selectable items which can be implemented with any applicable form or method in the present disclosure.

In some embodiments of the present disclosure, selectable item analysis module 410 may further include dynamic attribute analysis module 414. Dynamic attribute analysis module 414 may extract the one or more attribute elements based on a second part of information of the selectable items. The second part of information of the selectable items are related to time. The second part of information of the selectable items may include dynamic information of the selectable items which has temporal correlations, for instance, sound streams of videos or brightness value of videos, etc. In some embodiments, for extracting the one or more attribute elements from the selectable items which include dynamic information, dynamic attribute analysis module 414 may employ dynamic information capture technologies and machine learning algorithms to extract dynamic attributes from dynamic attributes of the selectable items, for instance, real-time sound capture and analysis, or NLEA algorithms, etc. In some embodiments, dynamic attribute analysis module 414 may further extract time-related attribute words which can present attributes included in or represented by the selectable items. Furthermore, dynamic attribute analysis module 414 may determine the one or more attribute elements corresponding to the time-related attribute words, for instance, an attribute element corresponding to attribute words "an applicable data file" extracted from real-time feedback information on a data file generated at a specific sample time point. Dynamic attribute analysis module 414 may further generate the attribute profiles of the selectable items based on the one or more attribute elements corresponding to the second part of information of the selectable items. In some embodiments, each of the one or more attribute elements is quantized as a first set of time-related variable proportions based on a set of sample time points. The first set of time-related variable proportions is based on a ratio between respective attribute information corresponding to each of the one or more attribute elements and all of the attribute information corresponding to the one or more attribute elements based on the set of sample time points. For instance, dynamic attribute analysis module 414 may generate attribute profile of selectable item 2 which includes the dynamic information as the following table:

TABLE 2

| ATTRIBUTE PROFILE OF SELECTABLE ITEM 2 | | | | | |
|---|---|---|---|---|---|
| | ATTRIBUTE 1 | ATTRIBUTE 2 | ATTRIBUTE 3 | ATTRIBUTE 4 | ATTRIBUTE 5 |
| TIME 1 | 32% | 57% | 3% | 2% | 6% |
| TIME 2 | 3% | 5% | 67% | 20% | 5% |
| TIME 3 | 15% | 65% | 1% | 4% | 15% |

As shown in Table 2, attribute profile of selectable item 2 includes five attribute elements, such as attribute 1, attribute 2, attribute 3, attribute 4, and attribute 5. Attribute profile of selectable item 2 also includes a set of sample time points such as time 1, time 2, and time 3. Each of attribute elements is respectively quantized as a time-related proportion corresponding to each of the set of sample time points. For instance, attribute 1 is quantized as 32% which is a proportion in selectable item 2 corresponding to time 1, and attribute 3 is quantized as 65% which is a proportion in selectable item 2 corresponding to time 3. It would be noted that table 2 would not provide a limitation to respective attribute profiles of selectable items which can be implemented with any applicable form or method in the present disclosure.

As shown in FIG. 4, item requesting agent analysis module 420 may generate an attribute requirement description of an item requesting agent based on a historical search dataset of the item requesting agent. The attribute requirement description may include at least part of the one or more attribute elements which are included in the selectable items. For instance, the attribute requirement description may include four attributes which are included in selectable item 1 and 2, such as attribute 1, attribute 2, and attribute 5. In some embodiments, for the aforementioned objectives or functionalities, item requesting agent analysis module 420 may receive a historical search dataset of an item requesting agent as shown in FIG. 4. The historical search dataset of the item requesting agent may carry and present aspects of item attributes, for instance, data types, data structures, data lengths, or data contents, etc. The historical search dataset may be related to or represented by the item requesting agent with various applicable forms. The historical search dataset of the item requesting agent may include search tracks of the item requesting agent. In some embodiments, the search tracks of the item requesting agent may include the following aspects: a historical search list, a time-based segment of the historical search list, or selectable items being visited by the item requesting agent, etc. The search tracks of the item requesting agent can record and represent respective attributes of the item requesting agent corresponding to accessed selectable items of the item requesting agent. Therefore, the attributes included in the accessed selectable items of the item requesting agent can be selected as the attribute requirement description of the item requesting agent by means of statistical analysis methods based on the search tracks, and the attribute requirement description of the item requesting agent can be employed to recommend selectable items to the item requesting agent.

In some embodiments of the present disclosure, item requesting agent analysis module 420 may further include attribute element extraction module 422. Attribute element extraction module 422 may extract the at least part of the one or more attribute elements based on the historical search dataset of the item requesting agent. The historical search dataset of the item requesting agent may include search tracks of the item requesting agent and the respective attribute profiles of selectable items visited by the item requesting agent. As mentioned in the above, the search tracks of the item requesting agent can record and represent respective attributes of the item requesting agent corresponding to accessed selectable items of the item requesting agent. The historical search dataset of the item requesting agent may further include the respective attribute profiles of selectable items visited by the item requesting agent. The attribute profiles of the selectable items visited by the item requesting agent, which include at least one of the one or more attribute elements, may be generated by attribute-based selectable item recommendation system 400 based on the one or more attribute elements included in the selectable items visited by the item requesting agent, or be pre-selected and labeled to the selectable items visited by the item requesting agent by means of other applicable resources, for instance, a library of respective attribute profiles of selectable items. Attribute element extraction module 422 may extract the at least part of the one or more attribute elements by means of statistical analysis based on the search tracks of the item requesting agent and the one or more attribute elements included in the respective attribute profiles of selectable items visited by the item requesting agent. For instance, the search tracks of the item requesting agent may record a set of selectable items visited by the item requesting agent, and the attribute elements in the attribute profiles of the set of selectable items include three attribute elements such as attribute 1, attribute 2, and attribute 5. The three attribute elements are a part of attribute elements included in all of selectable items which include more attribute elements than three attributes. As a result, attribute element extraction module 422 may extract the three attribute elements based on the historical search dataset of the item requesting agent to generate the attribute requirement description of the item requesting agent.

In some embodiments of the present disclosure, item requesting agent analysis module 420 may further include attribute requirement description generation module 424. Attribute requirement description generation module 424 may generate the attribute requirement description of the item requesting agent based on the at least part of the one or more attribute elements extracted by attribute element extraction module 422 and the attribute profiles of the selectable items visited by the item requesting agent. Each element of the at least part of the one or more attribute elements included in the attribute requirement description is quantized as a proportion base on a ratio between respective attribute information corresponding to each element of the at least part of the one or more attribute elements and all of the attribute information corresponding to the at least part of the one or more attribute elements. The proportion of each element included in the attribute requirement description is a time-irrelated proportion or a time-related proportion corresponding to whether the at least part of the one or more attribute elements and the attribute profiles of the selectable items having temporal correlations. In some embodiments, the proportion is a static proportion based on static information of the at least part of the one or more attribute elements and the attribute profiles of the selectable items visited by the item requesting agent. The static information is not provided with the temporal correlations depicted therein. For instance, attribute requirement description generation module 424 may generate an attribute requirement description including five attribute elements where each element of the at least part of the one or more attribute elements included in the attribute requirement description is a time-irrelated proportion as the following table:

TABLE 3

| ATTRIBUTE REQUIREMENT DESCRIPTION OF ITEM REQUESTING AGENT 1 | | | | |
|---|---|---|---|---|
| ATTRIBUTE 1 | ATTRIBUTE 2 | ATTRIBUTE 3 | ATTRIBUTE 4 | ATTRIBUTE 5 |
| 55% | 7% | 1% | 28% | 9% |

As shown in Table 3, attribute requirement description of item requesting agent 1 includes five attribute elements such as attribute 1, attribute 2, attribute 3, attribute 4, and attribute 5. Each of the attribute elements is respectively quantized as a time-irrelated proportion. For instance, attribute 1 is quantized as 55% which is a proportion in attribute requirement description of item requesting agent 1 based on the percentage of attribute 1 in the five attribute elements. It would be noted that Table 3 would not provide a limitation to an attribute requirement description of an item requesting agent which can be implemented with any applicable form or method in the present disclosure.

In some embodiments, the proportion is a dynamic proportion based on dynamic information of the at least part of the one or more attribute elements and the attribute profiles of the selectable items visited by the item requesting agent. The dynamic information has the temporal correlations based on variation of the dynamic information at the set of sample time points. As a result, each element included in the attribute requirement description of the item requesting agent is quantized as a second set of time-related variable proportions based on the set of sample time points. The second set of time-related variable proportions is corresponding to a ratio between respective attribute information corresponding to each element of the at least part of the one or more attribute elements and all of the attribute information corresponding to the at least part of the one or more attribute elements based on the set of sample time points. For instance, attribute requirement description generation module 424 may generate an attribute requirement description including five attribute elements where each element included in the attribute requirement description is a time-related proportion as the following table:

TABLE 4

| ATTRIBUTE REQUIREMENT DESCRIPTION OF ITEM REQUESTING AGENT 2 | | | | | |
|---|---|---|---|---|---|
| | ATTRIBUTE 1 | ATTRIBUTE 2 | ATTRIBUTE 3 | ATTRIBUTE 4 | ATTRIBUTE 5 |
| TIME 1 | 65% | 4% | 3% | 13% | 15% |
| TIME 2 | 22% | 25% | 1% | 33% | 19% |
| TIME 3 | 7% | 4% | 79% | 7% | 3% |

As shown in Table 4, attribute requirement description of item requesting agent 2 includes five attribute elements, such as attribute 1, attribute 2, attribute 3, attribute 4, and attribute 5. Attribute requirement description of item requesting agent 2 further includes the set of sample time points which are labeled as time 1, time 2, and time 3. Each of attribute elements is respectively quantized as a time-related proportion based on the set of sample time points. For instance, attribute 2 is quantized as 4% which is a proportion in attribute requirement description of item requesting agent 2 based on the percentage of attribute 1 in the five attribute elements at time 1, and attribute 5 is quantized as 3% based on the percentage of attribute 1 in the five attribute elements at time 3. It would be noted that Table 4 would not provide a limitation to an attribute requirement description of an item requesting agent which can be implemented with any applicable form or method in the present disclosure.

In some embodiments of the present disclosure, selectable item recommendation module 430 may determine recommended selectable items included in selectable items for an item requesting agent based on attribute profiles of the selectable items generated by selectable item analysis module 410 and an attribute requirement description of the item requesting agent generated by item requesting agent analysis module 420. The attribute profiles of the selectable items are suitable with the attribute requirement description of the item requesting agent based on attribute elements included in the attribute profiles of the selectable items and the attribute requirement description of the item requesting agent. For instance, the attribute elements in the attribute profiles of the recommended selectable items are similar or same as the attribute elements included in the attribute requirement description of the item requesting agent. Furthermore, the similar or same attribute elements have corresponding similar or same proportions between the attribute profiles of the recommended intent items and the attribute requirement description.

As shown in FIG. 4, for the aforementioned objectives or functionalities, selectable item recommendation module 430 further includes recommendation analysis module 432 and storage module 434. Selectable item recommendation module 430 may receive the attribute profiles of the selectable items from selectable item analysis module 410 and the attribute requirement description of the item requesting agent from item requesting agent analysis module 420 as shown in FIG. 4. The received attribute profiles of the selectable items can be stored into storage module 434. Recommendation analysis module 432 may perform analysis to determine the recommended intent items included in the selectable items for the item requesting agent based on the attribute profiles of the selectable items generated by selectable item analysis module 410 and the attribute requirement description of the item requesting agent generated item requesting agent analysis module 420.

In some embodiments of the present disclosure, the attribute profiles of the selectable items and the attribute requirement description of the item requesting agent may be irrelated to time, accordingly, attribute elements included in the attribute profiles and the attribute requirement description may be quantized as time-irrelated proportions. Based on the time-irrelated proportions, recommendation analysis module 432 may compare the one or more attribute elements included in the selectable items with the at least part of the one or more attribute elements included in the attribute requirement description of the item requesting agent, then determine one or more candidate selectable items based on the comparing. The one or more candidate selectable items may include consistent attribute elements with the at least part of the one or more attribute elements included in the attribute requirement description. Recommendation analysis module 432 may further calculate a M-dimensional Euclidean Distance between the attribute requirement description and each of attribute profiles of the one or more candidate selectable items based on respective proportions of the at least part of the one or more attribute elements included in the attribute requirement description and the consistent attribute elements included in the one or more candidate selectable items. M is equal to the attribute element number of the at least part of the one or more attribute elements included in the attribute requirement description. Then recommendation analysis module 432 may sort the one or more candidate selectable items based on the M-dimensional Euclidean Distance respectively corresponding to each of the one or more candidate selectable items by means of an ascending top-N sort. In some embodiments of the present disclosure, the ascending top-N sort is a standard top-N sort algorithm which sorts the one or more candidate selectable items based on the value of the M-dimensional Euclidean Distance respectively corresponding to the each of the one or more candidate selectable items in an ascending order which is from the smallest value to the largest value. The number of N can be pre-selected as requirements in the reality. For instance, the number of N may be pre-selected to be equal to 1 for getting a recommendation selectable item which is closest to the attribute requirement description of the item requesting agent, and the number of N may be pre-selected to be equal to 5 for selecting 5 selectable items from candidate selectable items which are closer to the attribute requirement description of the item requesting agent than other candidate selectable items. Recommendation analysis module 432 may further determine recommended selectable items for the item requesting agent based on results of the sorting. The recommended selectable items are top-N selectable items included in the one or more candidate selectable items. Accordingly, it means that one of the one or more candidate selectable items which has a smaller M-dimensional Euclidean Distance to the attribute requirement description of the item requesting agent has a greater probability to be selected as a recommendation selectable item to the item requesting agent.

In some embodiments of the present disclosure, the attribute profiles of the selectable items and the attribute requirement description of the item requesting agent may be related to time, correspondingly attribute elements included in the attribute profiles and the attribute requirement description may be quantized as time-related proportions. Based on the time-related proportions, recommendation analysis module 432 may compare the one or more attribute elements included in the selectable items with the at least part of the one or more attribute elements included in the attribute requirement description of the item requesting agent, then determine one or more candidate selectable items based on the comparing. The one or more candidate selectable items may include consistent attribute elements with the at least part of the one or more attribute elements included in the attribute requirement description of the item requesting agent. Furthermore, recommendation analysis module 432 may calculate a set of correlation coefficients between the consistent attribute elements included in the one or more candidate selectable items and the at least part of the one or more attribute elements included in the attribute requirement description of the item requesting agent. In some embodiments of the present disclosure, each of the correlation coefficients is a Pearson Correlation Coefficient between the consistent attribute elements included in each of the one or more candidate selectable items and the at least part of the one or more attribute elements included in the attribute requirement description of the item requesting agent. Each element included in the attribute requirement description of the item requesting agent is quantized as the second set of time-related variable proportions based on the set of sample time points. Recommendation analysis module 432 may further calculate a M-dimensional Euclidean Distance between the attribute requirement description of the item requesting agent and each of attribute profiles of the one or more candidate selectable items based on proportions of the at least part of the one or more attribute elements and the set of correlation coefficients. M is equal to the attribute element number of the at least part of the one or more attribute elements included in the attribute requirement description herein. Then recommendation analysis module 432 may further sort the one or more candidate selectable items based on the M-dimensional Euclidean Distance respectively corresponding to each of the one or more candidate selectable items by means of the ascending top-N sort. Recommendation analysis module 432 may further determine recommended selectable items for the item requesting agent based on results of the sorting. The recommended selectable items are top-N selectable items included in the one or more candidate selectable items. Based on the time-related proportions, one of the one or more candidate selectable items which has a smaller M-dimensional Euclidean Distance based on a correlation coefficient has a greater probability to be selected as a recommendation selectable item to the item requesting agent.

As shown in FIG. 4, recommendation analysis module 432 may further receive requirements of the item requesting agent. Recommendation analysis module 432 can adjust the attribute requirement description of the item requesting agent generated by item requesting agent analysis module 420 based on the requirements of the item requesting agent. Furthermore, recommendation analysis module 432 may determine recommended selectable items for the item requesting agent based on the attribute profiles of the selectable items and an adjusted attribute requirement description of the item requesting agent. The attribute profiles of the recommended selectable items are suitable with the adjusted attribute requirement description of the item requesting agent based on the attribute elements.

As shown in FIG. 4, recommendation analysis module 432 may further determine recommended selectable items for another item requesting agent based on the recommended selectable items corresponding to the item requesting agent based on the attribute requirement description of another item requesting agent fulfilling a preset similarity with the attribute requirement description of the item requesting agent. In some embodiments, the attribute requirement description of another item requesting agent can also be generated by item requesting agent analysis module 420. In some embodiments, the attribute requirement description of another item requesting agent can be obtained from other resources outside attribute-based selectable item recommendation system 400, for instance, a pre-selected attribute requirement description based on requirements of the other item requesting agent. The recommended selectable items corresponding to the item requesting agent is selected by attribute-based selectable item recommendation system 400 and stored in storage module 434. The preset similarity may be a threshold which can be selected based on various factors or requirements. It is defined as fulfilling the preset similarity that a similarity between the attribute requirement description of the item requesting agent and the attribute requirement description of the other item requesting agent is equal to or greater than the preset similarity. The similarity between the attribute requirement description of the item requesting agent and the attribute requirement description of the other item requesting agent is generated by means of methods or algorithm in the art which are omitted herein for the sake of simplicity.

It would be noted that the attribute-based selectable item recommendation system referred to as attribute-based selectable item recommendation system 400 according to some embodiments of this disclosure could be implemented by computer system/server 12 as shown in FIG. 1 and distributed cloud computing environment 50 as shown in FIGS. 2 and 3, for instance, a plurality of cloud computing nodes 10 perform the process management in distributed cloud computing environment 50 which further include respective cloud components implementing functions such as process element library module 450. Here, attribute-based selectable item recommendation system 400 is exemplarily and abstractly illustrated by a block diagram which does not explicitly exhaust or precisely limit entirety or components of attribute-based selectable item recommendation system 400 as shown in FIG. 4. Furthermore, it would be recognized that number and arrangement of elements or modules (the number of elements or modules and the arrangement thereof) in FIG. 4 are provided for the purpose of illustration only. An element or module can also be merged with other elements or modules to construct a new element or module which can implement all functions of the merged elements or modules, for instance, selectable item analysis module 410 and item requesting agent analysis module 420 can be merged together to construct a new module, or be split into two or more independent elements or modules which respectively implement a part of functions of the element or module.

Figure 5:
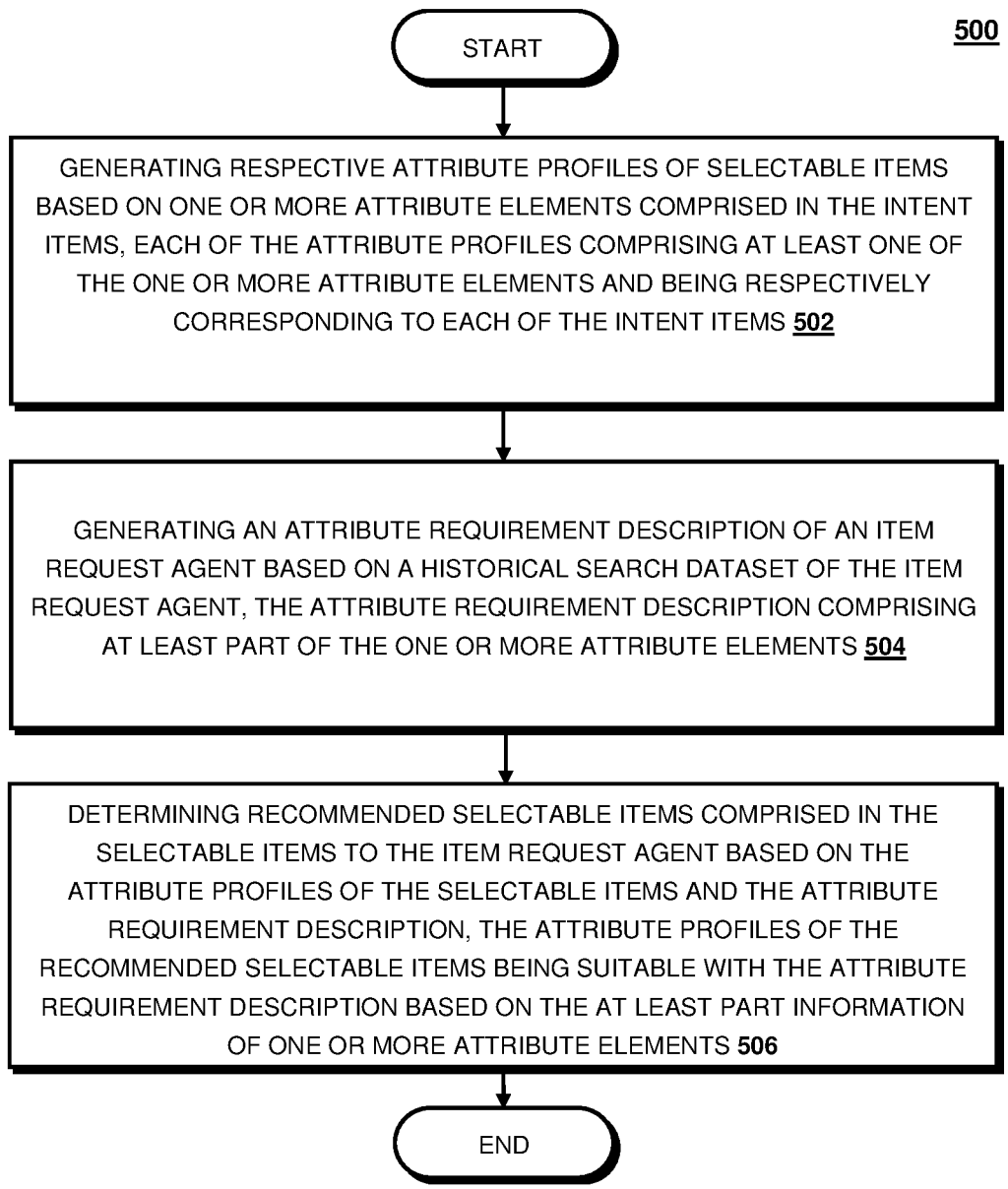
FIG. 5 depicts a flowchart illustrating an exemplary attribute-based selectable item recommendation method according to some embodiments of the present disclosure.

With reference now to FIG. 5, in which a process flow chart 500 of a method for attribute-based selectable item recommendation is depicted according to embodiments of the present disclosure. The process flow chart 500 is a corresponding method implemented by attribute-based selectable item recommendation system 400 described herein by means of one or more processors in a cloud computing system as shown in FIGS. 1, 2 and 3.

At block 502, attribute-based selectable item recommendation system 400 may generate respective attribute profiles of selectable items based on one or more attribute elements included in the selectable items. Each of attribute profiles is respectively corresponding to each of the selectable items, for instance, texts, videos, images, music, voices, messages or their combinations, etc. The selectable items may be generated or provided by various resources, for instance, selectable item providers, websites associated with selectable items, or applications associated with selectable items, etc. In the present disclosure, it is defined as an attribute element that an aspect of item, for instance, data types, data structures, data lengths, or data contents, etc. (collectively called attributes) may be included in or represented by selectable items with various applicable forms. A selectable item may include or represent one or more attribute elements. An attribute profile of a selectable item may provide a quantified approach of all attribute elements which are included in or represented by the selectable item by means of any applicable form. Accordingly, the selectable item can be identified by means of the attribute profile of the selectable item, and the attribute profile of the selectable item can be employed as an attribute compared with other selectable items to determine whether the selectable item may be recommended to item requesting agents.

At block 504, attribute-based selectable item recommendation system 400 may generate an attribute requirement description of an item requesting agent based on a historical search dataset of an item requesting agent. The attribute requirement description of the item requesting agent may include at least part of the one or more attribute elements which are included in the selectable items. The historical search dataset of the item requesting agent may carry and present an aspect of item attributes, for instance, data types, data structures, data lengths, or data contents, etc. (collectively called attributes) which may be related to or represented by the item requesting agent with various applicable actions or forms. The historical search dataset of the item requesting agent may include search tracks of the item requesting agent and the respective attribute profiles of selectable items visited by the item requesting agent. The search tracks of the item requesting agent may include the following aspects: a historical search list, a time-based segment of the historical search list, or selectable items being visited by the item requesting agent, etc. The search tracks of the item requesting agent records and represents respective attributes of the item requesting agent corresponding to accessed selectable items of the item requesting agent. Accordingly, the attributes of the accessed selectable items of the item requesting agent can be selected as the attribute requirement description of the item requesting agent which can be employed to recommend selectable items to the item requesting agent. The historical search dataset of the item requesting agent may further include the attribute profiles of the selectable items visited by the item requesting agent. The attribute profiles of the selectable items visited by the item requesting agent, which include at least one of the one or more attribute elements, may be generated by attribute-based selectable item recommendation system 400 based on the one or more attribute elements included in the selectable items visited by the item requesting agent, or be pre-selected and labeled to the selectable items visited by the item requesting agent by means of other applicable resources, for instance, a library of respective attribute profiles of selectable items.

At block 506, attribute-based selectable item recommendation system 400 may determine recommended selectable items included in selectable items for the item requesting agent based on the attribute profiles of the selectable items generated and the attribute requirement description of the item requesting agent. The attribute profiles of the recommended selectable items are suitable with the attribute requirement description of the item requesting agent based on the one or more attribute elements. As mentioned in the above, attribute elements included in the attribute profiles of the recommended selectable items are similar or same as attribute elements included in the attribute requirement description of the item requesting agent. Furthermore, the similar or same attribute elements have corresponding similar or same proportions between the attribute profiles of the recommended selectable items and the attribute requirement description of the item requesting agent.

It should be noted that the processing of process management is exemplarily and abstractly illustrated by the process flow chart 500 which does not explicitly exhaust or precisely limit entirety or components of the method of process management as shown in FIG. 5.

Figure 6:
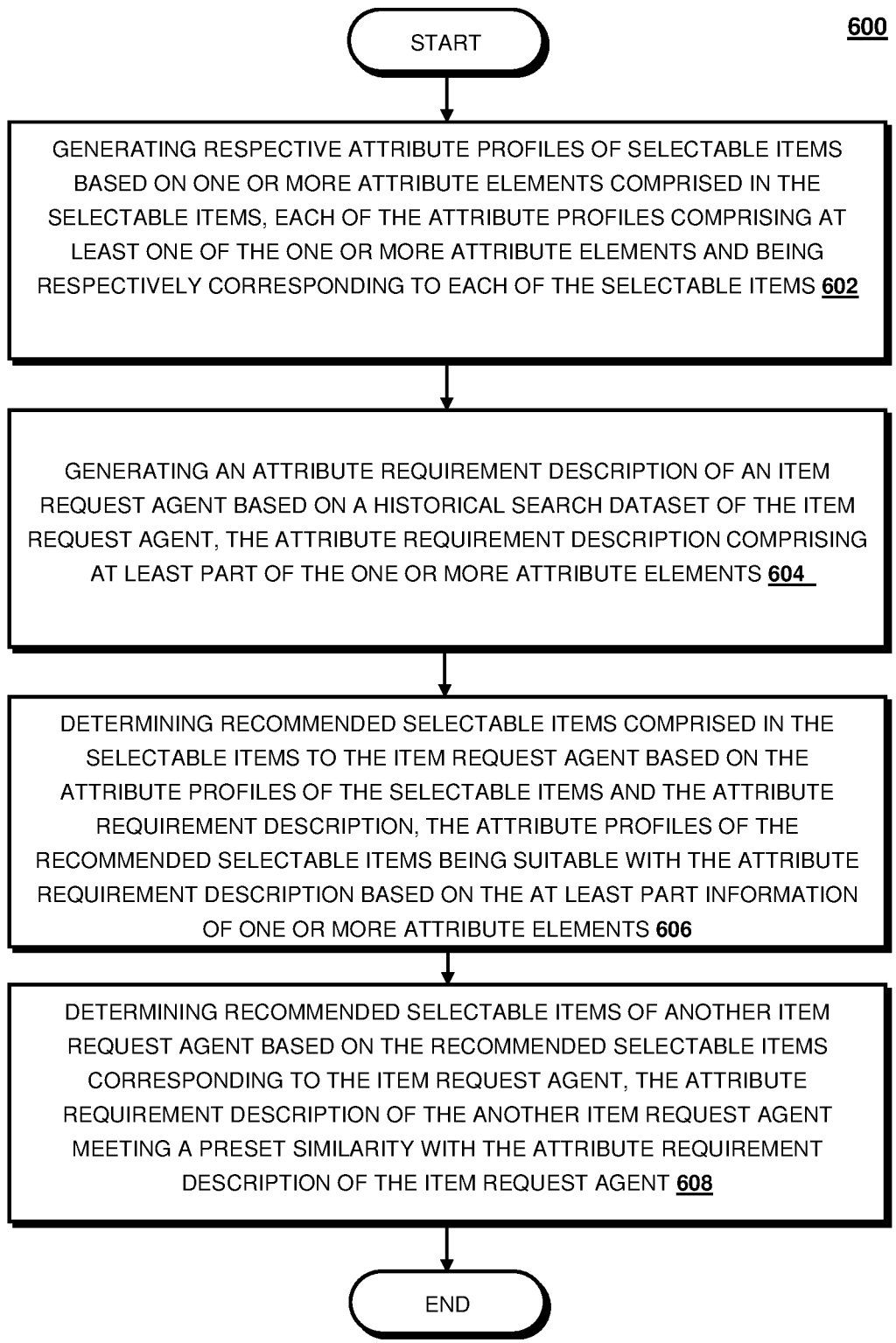
FIG. 6 depicts a flowchart illustrating another exemplary attribute-based selectable item recommendation method according to some embodiments of the present disclosure.

With reference now to FIG. 6, a process flow chart 600 of an exemplary method for attribute-based selectable item recommendation is depicted according to embodiments of the present disclosure. The exemplary method depicted by the process flow chart 600 can be implemented by a computing system as attribute-based selectable item recommendation system 400 shown in FIG. 4 and includes the method for attribute-based selectable item recommendation system as shown in FIG. 5.

At block 602, attribute-based selectable item recommendation system 400 may generate respective attribute profiles of selectable items based on one or more attribute elements included in the selectable items. Each attribute profile respectively corresponds to each of the selectable items. An attribute profile of a selectable item may provide a quantified approach of all attribute elements which are included in or represented by the selectable item by means of any applicable form. Accordingly, the selectable item can be identified by means of the attribute profile of the selectable item, and the attribute profile of the selectable item can be employed as an attribute compared with other selectable items to determine whether the selectable item may be recommended to item requesting agents.

At block 604, attribute-based selectable item recommendation system 400 may generate an attribute requirement description of an item requesting agent based on a historical search dataset of an item requesting agent. The attribute requirement description may include at least part of the one or more attribute elements. The historical search dataset of the item requesting agent may include search tracks of the item requesting agent and the respective attribute profiles of selectable items visited by the item requesting agent.

At block 606, attribute-based selectable item recommendation system 400 may determine recommended selectable items included in selectable items for the item requesting agent based on the attribute profiles of the selectable items and an attribute requirement description of the item requesting agent. The attribute profiles of the recommended selectable items are suitable with the attribute requirement description of the item requesting agent based on the one or more attribute elements which are included in the attribute requirement description of the item requesting agent and the attribute profiles of the selectable items.

At block 608, attribute-based selectable item recommendation system 400 may determine recommended selectable items for another item requesting agent based on the recommended selectable items corresponding to the item requesting agent. The attribute requirement description of another item requesting agent fulfills a preset similarity with the attribute requirement description of the item requesting agent. The attribute requirement description of another item requesting agent can also be generated by attribute-based selectable item recommendation system 400. The attribute requirement description of the other item requesting agent can be obtained from resources outside attribute-based selectable item recommendation system 400, for instance, a pre-selected attribute requirement description based on requirements of the other item requesting agent. The recommended selectable items corresponding to the item requesting agent is assigned by attribute-based selectable item recommendation system 400. As mentioned in the above, it is defined as fulfilling the preset similarity that a similarity between the attribute requirement description of the item requesting agent and the attribute requirement description of the other item requesting agent is equal to or greater than the preset similarity. The similarity between the attribute requirement description of the item requesting agent and the attribute requirement description of the other item requesting agent is generated by means of various methods or algorithm in the art which are omitted herein for the sake of simplicity.

Figure 7:
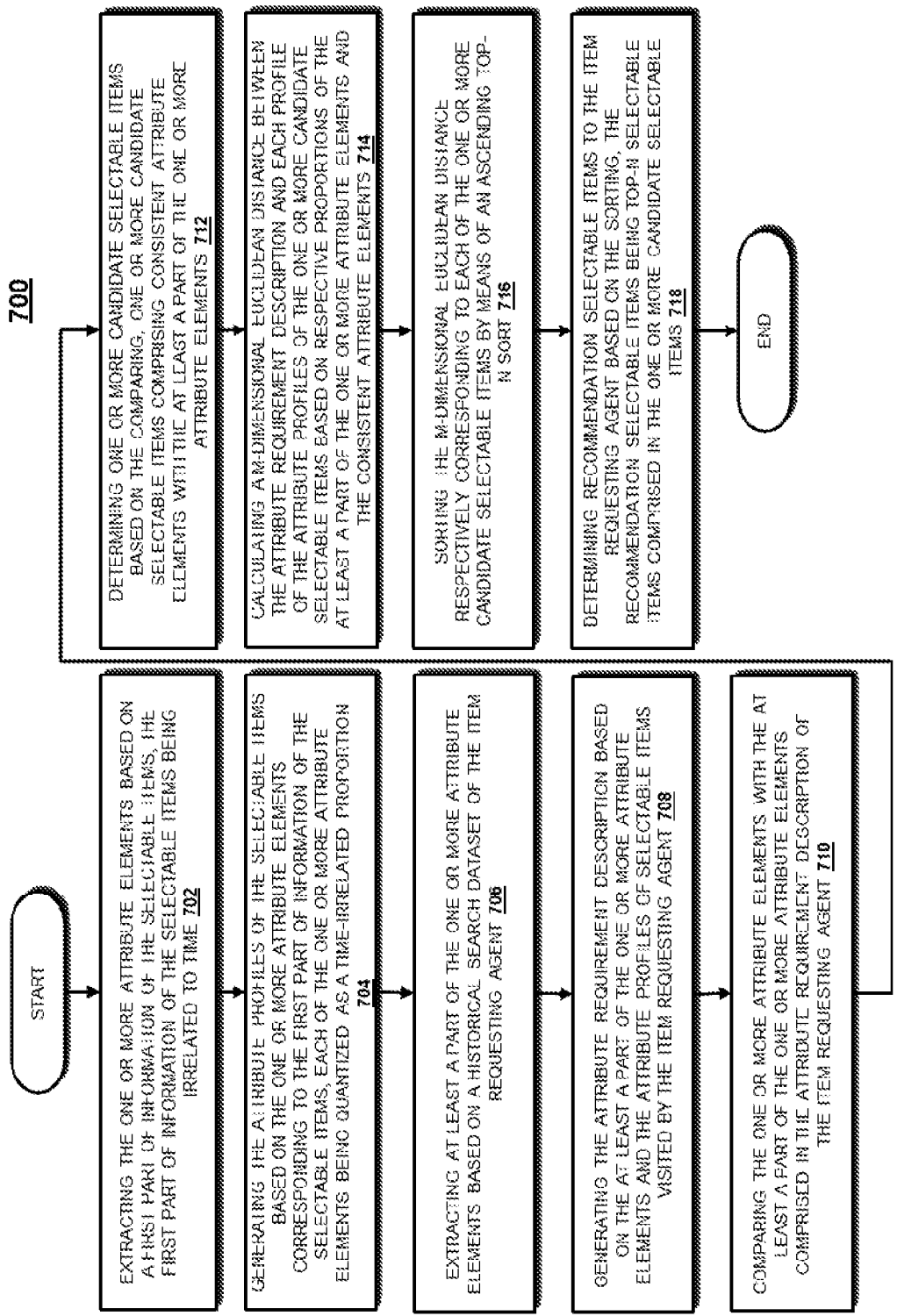
FIG. 7 depicts a flowchart illustrating another exemplary attribute-based selectable item recommendation method according to some embodiments of the present disclosure.

With reference now to FIG. 7, in which a process flow chart 700 of an exemplary method of attribute-based selectable item recommendation is depicted according to some embodiments of the present disclosure. The exemplary method depicted by the process flow chart 700 can be implemented by a computing system as attribute-based selectable item recommendation system 400 shown in FIG. 4 and includes the method for attribute-based selectable item recommendation as shown in FIG. 5.

At block 702, attribute-based selectable item recommendation system 400 may extract the one or more attribute elements based on a first part of information of the selectable items. The first part of information of the selectable items are irrelated to time. The first part of information of the selectable items may include static information of the selectable items which is not provided with temporal correlations, for instance, selectable item titles, selectable item abstracts, item requesting agent reviews, or selectable item productors, etc. In some embodiments, for extracting the one or more attribute elements based on the selectable items which are constructed by natural languages, attribute-based selectable item recommendation system 400 may employ machine learning algorithms to extract language attributes from the natural languages. In some embodiments, attribute-based selectable item recommendation system 400 may further extract attribute words which can present category attributes included in or represented by the selectable items. Furthermore, attribute-based selectable item recommendation system 400 may select the one or more attribute elements corresponding to the attribute words, for instance, an attribute element of attribute 1 corresponding to attribute words "a normal data file" extracted from item requesting agent reviews, or an attribute element of attribute 2 corresponding to attribute words "an broken data file" extracted from item requesting agent reviews on a data file.

At block 704, attribute-based selectable item recommendation system 400 may generate the attribute profiles of the selectable items based on the one or more attribute elements corresponding to the first part of information of the selectable items. Each of the one or more attribute elements is quantized as a time-irrelated proportion by attribute-based selectable item recommendation system 400.

At block 706, attribute-based selectable item recommendation system 400 may extract at least part of the one or more attribute elements based on a historical search dataset of the item requesting agent. The historical search dataset of the item requesting agent may include search tracks of the item requesting agent and the respective attribute profiles of selectable items visited by the item requesting agent. Attribute-based selectable item recommendation system 400 may extract the at least part of the one or more attribute elements by means of statistical analysis based on the search tracks of the item requesting agent and attribute elements included in the attribute profiles of the selectable items visited by the item requesting agent. For instance, the search tracks of the item requesting agent may record a set of selectable items visited by the item requesting agent, and the attribute elements included in the attribute profiles of the set of selectable items include three attribute elements such as attribute 1, attribute 2, and attribute 5. The three attribute elements are a part of attribute elements included in all of selectable items which may include more than three attributes elements. As a result, attribute-based selectable item recommendation system 400 may extract the three attribute elements based on the historical search dataset of the item requesting agent for generating the attribute requirement description of the item requesting agent.

At block 708, attribute-based selectable item recommendation system 400 may generate the attribute requirement description of the item requesting agent based on the at least part of the one or more attribute elements and the attribute profiles of the selectable items visited by the item requesting agent. Each element of the at least part of the one or more attribute elements included in the attribute requirement description of the item requesting agent is quantized as a proportion. The proportion of each element included in the attribute requirement description of the item requesting agent is a time-irrelated proportion corresponding to the at least part of the one or more attribute elements and the attribute profiles of the selectable items not being provided with temporal correlations. The proportion is a static proportion based on static information of the at least part of the one or more attribute elements and the attribute profiles of the selectable items.

At block 710, attribute-based selectable item recommendation system 400 may compare one or more attribute elements included in the selectable items with at least part of the one or more attribute elements included in the attribute requirement description of the item requesting agent based on the time-irrelated proportions.

At block 712, attribute-based selectable item recommendation system 400 may select one or more candidate selectable items based on the comparing. The one or more candidate selectable items may include consistent attribute elements with the at least part of the one or more attribute elements included in the attribute requirement description of the item requesting agent.

At block 714, attribute-based selectable item recommendation system 400 may calculate a M-dimensional Euclidean Distance between the attribute requirement description of the item requesting agent and each of attribute profiles of the one or more candidate selectable items based on respective proportions of the at least part of the one or more attribute elements included in the attribute requirement description of the item requesting agent and the consistent attribute elements included in the one or more candidate selectable items. M is equal to number of attribute elements included in the attribute requirement description. Attribute-based selectable item recommendation system 400 may calculate a Euclidean Distance between the attribute requirement description of the item requesting agent and an attribute profile of a candidate selectable item as:

$$d(x,y) = \sqrt{(x_1-y_1)^2 + (x_2-y_2)^2 + \ldots + (x_m-y_m)^2} = \sqrt{\sum_{i=1}^{m}(x_i-y_i)^2} \quad (1)$$

Here, $x_i$ is a proportion of an attribute element included in an attribute requirement description of an item requesting agent;

$y_i$ is a proportion of an attribute element included in an attribute profile of a candidate selectable item;

m is the dimension number of the Euclidean Distance and equal to the number of attribute elements included in the attribute requirement description of the item requesting agent;

$d(x, y)$ is the value of the distance.

At block 716, attribute-based selectable item recommendation system 400 may sort the one or more candidate selectable items based on the M-dimensional Euclidean Distance respectively corresponding to each of the one or more candidate selectable items by means of a distance ascending top-N sort. The ascending top-N sort is a standard top-N sort algorithm which sorts the one or more candidate selectable items based on the value of the M-dimensional Euclidean Distance respectively corresponding to the each of the one or more candidate selectable items in an ascending order from the smallest value to largest value. The number of N can be pre-selected as requirements in the reality.

At block 718, attribute-based selectable item recommendation system 400 may recommend selectable items to the item requesting agent based on results of the sorting. Recommended selectable items are top-N selectable items included in the one or more candidate selectable items. It means that one of the one or more candidate selectable items which has a smaller M-dimensional Euclidean Distance to the attribute requirement description of the item requesting agent has a greater probability to be selected as the recommended selectable items for the item requesting agent.

Figure 8:
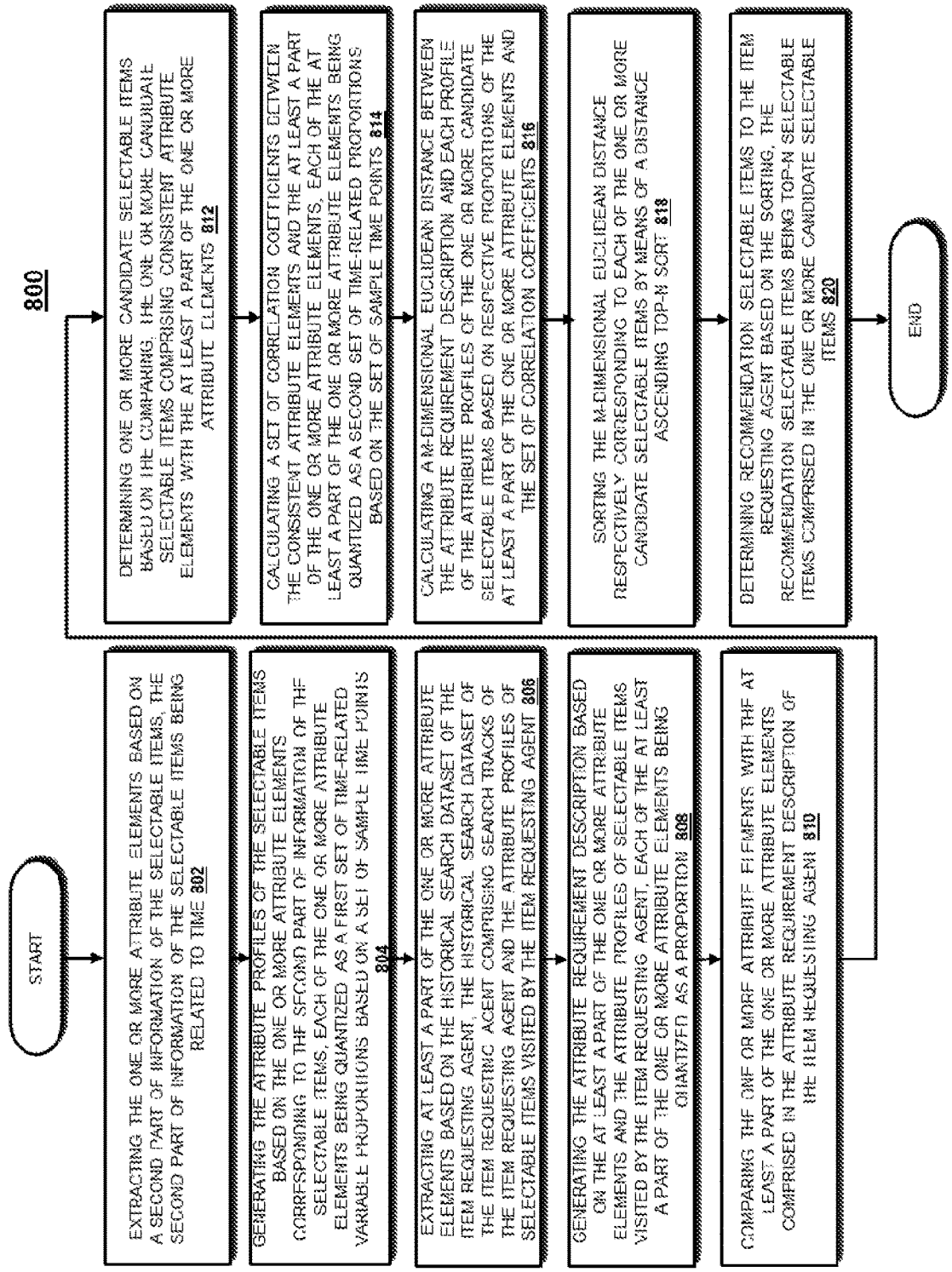
FIG. 8 depicts a flow chart illustrating another exemplary attribute-based selectable item recommendation method according to some embodiments of the present disclosure.

With reference now to FIG. 8, in which a process flow chart 800 of an exemplary method of attribute-based selectable item recommendation is depicted according to some embodiments of the present disclosure. The exemplary method depicted by the process flow chart 800 can be implemented by a computing system as attribute-based selectable item recommendation system 400 shown in FIG. 4 and includes the method for attribute-based selectable item recommendation as shown in FIG. 5.

At block 802, attribute-based selectable item recommendation system 400 may extract the one or more attribute elements based on a second part of information of the selectable items. The second part of information of the selectable items are related to time. The second part of information of the selectable items may include dynamic information of the selectable items which has temporal correlations, for instance, a speech streams of films, subtitles of videos, or brightness value of videos, etc. For extracting the one or more attribute elements based on the selectable items which include dynamic information, attribute-based selectable item recommendation system 400 may employ dynamic information capture technologies and machine learning algorithms to capture and extract dynamic attributes from item attributes of the selectable items, for instance, real-time speech capture and analysis, and NLEA algorithms. Attribute-based selectable item recommendation system 400 may extract time-related attribute words which can present category attributes included in or represented by the selectable items. Furthermore, Attribute-based selectable item recommendation system 400 may select the one or more attribute elements corresponding to the time-related attribute words, for instance, an attribute element corresponding to attribute words "an applicable data file"

extracted from real-time feedback information on a data file generated at a specific sample time point.

At block 804, attribute-based selectable item recommendation system 400 may generate the attribute profiles of the selectable items based on the one or more attribute elements corresponding to the second part of information of the selectable items. Each of the one or more attribute elements is quantized as a first set of time-related variable proportions based on a set of sample time points.

At block 806, attribute-based selectable item recommendation system 400 may extract at least part of the one or more attribute elements based on a historical search dataset of the item requesting agent. The historical search dataset of the item requesting agent may include search tracks of the item requesting agent and the respective attribute profiles of selectable items visited by the item requesting agent. As mentioned in the above, attribute-based selectable item recommendation system 400 may extract the at least part of the one or more attribute elements by means of statistical analysis based on the search tracks of the item requesting agent and attribute elements included in the attribute profiles of the selectable items visited by the item requesting agent.

At block 808, attribute-based selectable item recommendation system 400 may generate the attribute requirement description of the item requesting agent based on the at least part of the one or more attribute elements and the attribute profiles of the selectable items visited by the item requesting agent. Each element of the at least part of the one or more attribute elements included in the attribute requirement description of the item requesting agent is quantized as a proportion. The proportion is a dynamic proportion based on dynamic information of the at least part of the one or more attribute elements and the attribute profiles of the selectable items which are visited by the item requesting agent. The dynamic information has the temporal correlations based on variation of the dynamic information at the set of sample time points.

At block 810, attribute-based selectable item recommendation system 400 may compare the one or more attribute elements included in the selectable items with the at least part of the one or more attribute elements included in the attribute requirement description of the item requesting agent based on the time-related proportions.

At block 812, attribute-based selectable item recommendation system 400 may select one or more candidate selectable items based on the comparing. The one or more candidate selectable items may include consistent attribute elements with the at least part of the one or more attribute elements included in the attribute requirement description of the item requesting agent.

At block 814, attribute-based selectable item recommendation system 400 may calculate a set of correlation coefficients between the consistent attribute elements included in the one or more candidate selectable items and the at least part of the one or more attribute elements included in the attribute requirement description of the item requesting agent based on the set of sample time points. In some embodiments, each of the correlation coefficients is a Pearson Correlation Coefficient between the consistent attribute elements included in each of the one or more candidate selectable items and the at least part of the one or more attribute elements included in the attribute requirement description of the item requesting agent based on the set of sample time points. Each element of the at least part of the one or more attribute elements included in the attribute requirement description are quantized as a second set of time-related variable proportions based on the set of sample time points. Attribute-based selectable item recommendation system 400 may calculate a Pearson Correlation Coefficient between each attribute element of the consistent attribute elements included in each of the one or more candidate selectable items and each attribute element of the at least part of the one or more attribute elements included in the attribute requirement description of the item requesting agent as:

$$r = \frac{\sum_{i=1}^{n}(x_i - \bar{x})(y_i - \bar{y})}{\sqrt{\sum_{i=1}^{n}(x_i - \bar{x})^2}\sqrt{\sum_{i=1}^{n}(y_i - \bar{y})^2}} \quad (2)$$

Here, $x_i$ is a proportion of an attribute element included in the attribute requirement description of the item requesting agent (i.e., a proportion of the second set of time-related variable proportions) corresponding to a sample time point included in a set of sample time points;

$y_i$ is a proportion of one of the consistent attribute elements which are included in one of the one or more candidate selectable items (i.e., a proportion of the first set of time-related variable proportions) corresponding to the sample time point;

$\bar{x}$ is an arithmetic mean of proportions of attribute elements included in the attribute requirement description of the item requesting agent (i.e., an arithmetic mean of the second set of time-related variable proportions) corresponding to the set of sample time points;

$\bar{y}$ is an arithmetic mean of proportions of the consistent attribute elements included in one of the one or more candidate selectable items corresponding to the set of sample time points;

n is equal to number of attribute elements included in the attribute requirement description of the item requesting agent;

r is the value of the Pearson Correlation Coefficient corresponding to the set of sample time points.

At block 816, attribute-based selectable item recommendation system 400 may calculate a M-dimensional Euclidean Distance between the attribute requirement description of the item requesting agent and each of attribute profiles of the one or more candidate selectable items based on proportions of the at least part of the one or more attribute elements and the set of correlation coefficients. M is equal to attribute element number of the at least part of the one or more attribute elements included in the attribute requirement description herein. In some embodiments of the present disclosure, motion-based selectable item recommendation system 400 may calculate the Euclidean Distance based on proportions of the at least part of the one or more attribute elements and the set of correlation coefficients as:

$$d(x,r) = \sqrt{(x_1-r_1)^2 + (x_2-r_2)^2 + \ldots + (x_m-r_m)^2} = \sqrt{\sum_{i=1}^{m}(x_i-r_i)^2} \quad (3)$$

Here, $x_i$ is a proportion of an attribute element included in the attribute requirement description of the item requesting agent;

$r_i$ is one of the set of correlation coefficients corresponding to an attribute element included in one of the one or more candidate selectable items;

m is the dimension number of the Euclidean Distance and equal to the number of attribute elements included in the attribute requirement description of the item requesting agent;

d(x, r) is the value of the distance.

At block 818, attribute-based selectable item recommendation system 400 may sort the one or more candidate selectable items based on the M-dimensional Euclidean Distance respectively corresponding to each of the one or more candidate selectable items by means of an ascending top-N sort.

At block 820, attribute-based selectable item recommendation system 400 may determine recommended selectable items for the item requesting agent based on results of the sorting. Recommended selectable items are top-N selectable items included in the one or more candidate selectable items. Based on the time-related proportions, one of the one or more candidate selectable items which has a smaller M-dimensional Euclidean Distance based on a correlation coefficient has a greater probability to be selected as the recommended selectable items for the item requesting agent.

It should be noted that the exemplary methods for process management according to embodiments of this disclosure could be implemented by computer system/server 12 of FIG. 1.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may include copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which includes one or more executable instructions for implementing the specified logical function(s). In some alternative implementations, the functions noted in the blocks may occur out of the order noted in the Figures. For example, two blocks shown in succession may, in fact, be accomplished as one step, performed concurrently, substantially concurrently, in a partially or wholly temporally overlapping manner, or the blocks may sometimes be performed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method including:
   generating, by one or more processors, respective attribute profiles of selectable items based on one or more attribute elements included in the selectable items, each of the attribute profiles including at least one of the one or more attribute elements and being respectively corresponding to each of the selectable items;
   generating, by one or more processors, an attribute requirement description of an item requesting agent based on a historical search dataset of the item requesting agent, the attribute requirement description including at least part of the one or more attribute elements; and
   determining, by one or more processors, recommended selectable items included in the selectable items for the item requesting agent based on the attribute profiles of the selectable items and the attribute requirement description, the attribute profiles of the recommended selectable items being suitable with the attribute requirement description based on the at least part of one or more attribute elements;
   wherein generating the attribute requirement description of the item requesting agent based on the historical search dataset of the item requesting agent includes:
   extracting, by one or more processors, the at least part of the one or more attribute elements based on the historical search dataset of the item requesting agent;
   generating, by one or more processors, the attribute requirement description based on the at least part of the one or more attribute elements and the attribute profiles of the selectable items visited by the item requesting agent;
   wherein generating the attribute profiles of the selectable items based on the attribute elements included in the selectable items includes:
   extracting, by one or more processors, the one or more attribute elements based on a second part of information of the selectable items, the second part of information of the selectable items being related to time; and
   generating, by one or more processors, the attribute profiles of the selectable items based on the one or more attribute elements corresponding to the second part of information of the selectable items;
   wherein determining the recommended selectable items included in the selectable items for the item requesting agent based on the attribute profiles of the selectable items and the attribute requirement description of the item requesting agent includes:
   comparing, by one or more processors, the one or more attribute elements with the at least part of the one or more attribute elements included in the attribute requirement description of the item requesting agent;
   determining, by one or more processors, one or more candidate selectable items based on the comparing, one or more candidate selectable items including consistent attribute elements with the at least part of the one or more attribute elements included in the attribute requirement description of the item requesting agent;
   calculating, by one or more processors, a set of correlation coefficients between the consistent attribute elements and the at least part of the one or more attribute elements included in the attribute requirement description of the item requesting agent, each element of the at least part of the one or more attribute elements included in the attribute requirement description of the item requesting agent being quantized as a second set of time-related variable proportions based on the set of sample time points;
   calculating, by one or more processors, a distance between the attribute requirement description and each profile of the attribute profiles of the one or more candidate selectable items based on proportions of the at least part of the one or more attribute elements and the set of correlation coefficients;
   sorting, by one or more processors, the one or more candidate selectable items based on the distance respectively corresponding to each of the one or more candidate selectable items by means of an ascending top-N sort; and
   determining, by one or more processors, recommended selectable items for the item requesting agent based on the sorting, the recommended selectable items being top-N selectable items included in the one or more candidate selectable items.

2. The method of claim 1, wherein
   the historical search dataset of the item requesting agent including search tracks of the item requesting agent and the respective attribute profiles of selectable items visited by the item requesting agent; and
   each element of the at least part of the one or more attribute elements included in the attribute requirement description being quantized as a proportion based on a ratio between respective attribute information corresponding to the each element of the at least part of the one or more attribute elements and all of the attribute information corresponding to the at least part of the one or more attribute elements.

3. The method of claim 1, wherein generating the attribute profiles of the selectable items based on the one or more attribute elements included in the selectable items includes:
   extracting, by one or more processors, the one or more attribute elements based on a first part of information of the selectable items, the first part of information of the selectable items being irrelated to time; and generating, by one or more processors, the attribute profiles of the selectable items based on the one or more attribute elements corresponding to the first part of information of the selectable items, each of the one or more attribute elements being quantized as a time-irrelated proportion based on a ratio between respective attribute information corresponding to the each of the one or more attribute elements and all of the attribute information corresponding to the one or more attribute elements.

4. The method of claim 3, wherein determining the recommended selectable items included in the selectable items for the item requesting agent based on the attribute profiles of the selectable items and the attribute requirement description of the item requesting agent includes:
   comparing, by one or more processors, the one or more attribute elements with the at least part of the one or more attribute elements included in the attribute requirement description of the item requesting agent;
   determining, by one or more processors, one or more candidate selectable items based on the comparing, the one or more candidate selectable items including consistent attribute elements with the at least part of the one or more attribute elements included in the attribute requirement description of the item requesting agent;
   calculating, by one or more processors, a distance between the attribute requirement description and each profile of the attribute profiles of the one or more candidate selectable items based on respective proportions of the at least part of the one or more attribute elements and the consistent attribute elements;
   sorting, by one or more processors, the one or more candidate selectable items based on the distance respectively corresponding to each of the one or more candidate selectable items by means of an ascending top-N sort; and
   determining, by one or more processors, recommended selectable items for the item requesting agent based on the sorting, the recommended selectable items being top-N selectable items included in the one or more candidate selectable items.

5. The method of claim 1, wherein
   each of the one or more attribute elements being quantized as a first set of time-related variable proportions based on a ratio between respective attribute information corresponding to the each of the one or more attribute elements and all of the attribute information corresponding to the one or more attribute elements based on a set of sample time points.

6. The method of claim 1, wherein the correlation coefficients are Pearson Correlation Coefficients between the consistent attribute elements included in the one or more candidate selectable items and the at least part of the one or more attribute elements included in the attribute requirement description of the item requesting agent.

7. The method of claim 1, further including:
   determining, by one or more processors, recommended selectable items of another item requesting agent based on the recommended selectable items corresponding to the item requesting agent, the attribute requirement description of the another item requesting agent fulfilling a preset similarity with the attribute requirement description of the item requesting agent.

8. The method of claim 1, further including:
   adjusting, by one or more processors, the attribute requirement description of the item requesting agent based on requirements of the item requesting agent; and
   determining, by one or more processors, the recommended selectable items based on the attribute profiles of the selectable items and the adjusted attribute requirement description of the item requesting agent, the attribute profiles of the recommended selectable items being suitable with the adjusted attribute requirement description based on the one or more attribute elements.

9. A system including:
   a computer system including a computer readable storage medium having program instructions embodied therewith, the program instructions executable by a computer to cause the computer to:
   generate respective attribute profiles of selectable items based on one or more attribute elements included in the selectable items, each of the attribute profiles including at least one of the one or more attribute elements and being respectively corresponding to each of the selectable items;
   generate an attribute requirement description of an item requesting agent based on a historical search dataset of the item requesting agent, the attribute requirement description including at least part of the one or more attribute elements; and
   determine recommended selectable items included in the selectable items for the item requesting agent based on the attribute profiles of the selectable items and the attribute requirement description, the attribute profiles of the recommended selectable items being suitable with the attribute requirement description based on the at least part of one or more attribute elements;
   wherein the generation of the attribute requirement description of the item requesting agent based on the historical search dataset of the item requesting agent includes:
   extract, by one or more processors, the at least part of the one or more attribute elements based on the historical search dataset of the item requesting agent;
   generate, by one or more processors, the attribute requirement description based on the at least part of the one or more attribute elements and the attribute profiles of the selectable items visited by the item requesting agent;
   wherein the generation of the attribute profiles of the selectable items based on the attribute elements included in the selectable items includes:
   extract, by one or more processors, the one or more attribute elements based on a second part of information of the selectable items, the second part of information of the selectable items being related to time; and
   generate, by one or more processors, the attribute profiles of the selectable items based on the one or more attribute elements corresponding to the second part of information of the selectable items;
   wherein the determination of the recommended selectable items included in the selectable items for the item requesting agent based on the attribute profiles of the selectable items and the attribute requirement description of the item requesting agent includes:
   compare, by one or more processors, the one or more attribute elements with the at least part of the one or more attribute elements included in the attribute requirement description of the item requesting agent;
   determine, by one or more processors, one or more candidate selectable items based on the comparing, one or more candidate selectable items including consistent attribute elements with the at least part of the one or more attribute elements included in the attribute requirement description of the item requesting agent;

calculate, by one or more processors, a set of correlation coefficients between the consistent attribute elements and the at least part of the one or more attribute elements included in the attribute requirement description of the item requesting agent, each element of the at least part of the one or more attribute elements included in the attribute requirement description of the item requesting agent being quantized as a second set of time-related variable proportions based on the set of sample time points;

calculate, by one or more processors, a distance between the attribute requirement description and each profile of the attribute profiles of the one or more candidate selectable items based on proportions of the at least part of the one or more attribute elements and the set of correlation coefficients;

sort, by one or more processors, the one or more candidate selectable items based on the distance respectively corresponding to each of the one or more candidate selectable items by means of an ascending top-N sort; and determine, by one or more processors, recommended selectable items for the item requesting agent based on the sorting, the recommended selectable items being top-N selectable items included in the one or more candidate selectable items.

10. The system of claim 9, wherein the historical search dataset of the item requesting agent including search tracks of the item requesting agent and the respective attribute profiles of selectable items visited by the item requesting agent;

and the generating of the attribute requirement description of the item requesting agent based on the historical search dataset of the item requesting agent further includes program instructions executable by the computer to cause the computer to:

generate the attribute requirement description based on the at least part of the one or more attribute elements and the attribute profiles of the selectable items visited by the item requesting agent, each element of the at least part of the one or more attribute elements included in the attribute requirement description being quantized as a proportion based on a ratio between respective attribute information corresponding to the each element of the at least part of the one or more attribute elements and all of the attribute information corresponding to the at least part of the one or more attribute elements.

11. The system of claim 9, wherein generating the attribute profiles of the selectable items based on the one or more attribute elements included in the selectable items further includes program instructions executable by the computer to cause the computer to:

extract the one or more attribute elements based on a first part of information of the selectable items, the first part of information of the selectable items being irrelated to time; and generate the attribute profiles of the selectable items based on the one or more attribute elements corresponding to the first part of information of the selectable items, each of the one or more attribute elements being quantized as a time-irrelated proportion based on a ratio between respective attribute information corresponding to the each of the one or more attribute elements and all of the attribute information corresponding to the one or more attribute elements.

12. The system of claim 9, wherein each of the one or more attribute elements being quantized as a first set of time-related variable proportions based on a ratio between respective attribute information corresponding to the each of the one or more attribute elements and all of the attribute information corresponding to the one or more attribute elements based on a set of sample time points.

13. A computer program product, the computer program product including a computer readable storage medium having program instructions embodied therewith, the program instructions executable by a computer to cause the computer to:

generate, using said computer, respective attribute profiles of selectable items based on one or more attribute elements included in the selectable items, each of the attribute profiles including at least one of the one or more attribute elements and being respectively corresponding to each of the selectable items;

generate, using said computer, an attribute requirement description of an item requesting agent based on a historical search dataset of the item requesting agent, the attribute requirement description including at least part of the one or more attribute elements; and determine, using said computer, recommended selectable items included in the selectable items for the item requesting agent based on the attribute profiles of the selectable items and the attribute requirement description, the attribute profiles of the recommended selectable items being suitable with the attribute requirement description based on the at least part of one or more attribute elements;

wherein the generation of the attribute requirement description of the item requesting agent based on the historical search dataset of the item requesting agent includes:

extract, by one or more processors, the at least part of the one or more attribute elements based on the historical search dataset of the item requesting agent;

generate, by one or more processors, the attribute requirement description based on the at least part of the one or more attribute elements and the attribute profiles of the selectable items visited by the item requesting agent;

wherein the generation of the attribute profiles of the selectable items based on the attribute elements included in the selectable items includes:

extract, by one or more processors, the one or more attribute elements based on a second part of information of the selectable items, the second part of information of the selectable items being related to time; and generate, by one or more processors, the attribute profiles of the selectable items based on the one or more attribute elements corresponding to the second part of information of the selectable items;

wherein the determination of the recommended selectable items included in the selectable items for the item requesting agent based on the attribute profiles of the selectable items and the attribute requirement description of the item requesting agent includes:

compare, by one or more processors, the one or more attribute elements with the at least part of the one or more attribute elements included in the attribute requirement description of the item requesting agent;

determine, by one or more processors, one or more candidate selectable items based on the comparing, one or more candidate selectable items including consistent attribute elements with the at least part of the one or more attribute elements included in the attribute requirement description of the item requesting agent;

calculate, by one or more processors, a set of correlation coefficients between the consistent attribute elements and the at least part of the one or more attribute elements included in the attribute requirement description of the item requesting agent, each element of the at least part of the one or more attribute elements included in the attribute requirement description of the item requesting agent being quantized as a second set of time-related variable proportions based on the set of sample time points;

calculate, by one or more processors, a distance between the attribute requirement description and each profile of the attribute profiles of the one or more candidate selectable items based on proportions of the at least part of the one or more attribute elements and the set of correlation coefficients;

sort, by one or more processors, the one or more candidate selectable items based on the distance respectively corresponding to each of the one or more candidate selectable items by means of an ascending top-N sort; and determine, by one or more processors, recommended selectable items for the item requesting agent based on the sorting, the recommended selectable items being top-N selectable items included in the one or more candidate selectable items.

14. The computer program product of claim 13, wherein the historical search dataset of the item requesting agent including search tracks of the item requesting agent and the respective attribute profiles of selectable items visited by the item requesting agent; and each element of the at least part of the one or more attribute elements included in the attribute requirement description being quantized as a proportion based on a ratio between respective attribute information corresponding to the each element of the at least part of the one or more attribute elements and all of the attribute information corresponding to the at least part of the one or more attribute elements.

15. The computer program product of claim 13, wherein generating the attribute profiles of the selectable items based on the one or more attribute elements included in the selectable items further includes program instructions executable by the computer to cause the computer to:

extract, using said computer, the one or more attribute elements based on a first part of information of the selectable items, the first part of information of the selectable items being irrelated to time; and generate, using said computer, the attribute profiles of the selectable items based on the one or more attribute elements corresponding to the first part of information of the selectable items, each of the one or more attribute elements being quantized as a time-irrelated proportion base on a ratio between respective attribute information corresponding to the each of the one or more attribute elements and all of the attribute information corresponding to the one or more attribute elements.

16. The computer program product of claim 13, wherein each of the one or more attribute elements being quantized as a first set of time-related variable proportions based on a ratio between the attribute information corresponding to the each of the one or more attribute elements and all of the attribute information corresponding to the one or more attribute elements based on a set of sample time points.

17. The computer program product of claim 13, further including program instructions executable by the computer to cause the computer to:

determine, using said computer, recommended selectable items of another item requesting agent based on the recommended selectable items corresponding to the item requesting agent, the attribute requirement description of the another item requesting agent fulfilling a preset similarity with the attribute requirement description of the item requesting agent.

* * * * *